United States Patent [19]
Gawin et al.

[11] 3,838,916
[45] Oct. 1, 1974

[54] MICROFICHE READER/PROJECTOR
[75] Inventors: Adolph J. Gawin, Skokie; Robert L. Kearney, Northbrook; Eugene Sather, Deerfield, all of Ill.
[73] Assignee: Bell & Howell Company, Chicago, Ill.
[22] Filed: Apr. 9, 1973
[21] Appl. No.: 349,492

[52] U.S. Cl. .................................. 353/27, 353/72
[51] Int. Cl. ...................... G03b 21/11, G03b 23/08
[58] Field of Search ........................ 353/27, 74, 78

[56] References Cited
UNITED STATES PATENTS
3,509,651  5/1970  Robbins .............................. 353/27
3,667,839  6/1971  Artaud ................................ 353/27
3,720,462  3/1973  Dali .................................... 353/27

FOREIGN PATENTS OR APPLICATIONS
996,137  12/1951  France .................................. 353/79

Primary Examiner—Harry N. Haroian
Assistant Examiner—A. Jason Mirabito
Attorney, Agent, or Firm—Robert A. Walsh; Gerald B. Epstein

[57] ABSTRACT

An improved visual display device is provided of the type which displays on a screen information carried by an information-bearing microform member. The device includes improved means for precisely positioning selected areas of the microform member relative to a projection lens, as well as improved means for accurately focusing a high magnification projection lens. A carriage for supporting and selectively positioning the microform member relative to the projection lens includes at least two pulleys arranged in a block and tackle configuration, coupled to a longitudinally movable control member for realizing a mechanical advantage in achieving accurate positioning of the carriage. Focusing of the lens is achieved utilizing at least one pair of gears having differing relative diameters providing a mechanical advantage so that as the first gear is rotated, the lens is accurately focused.

13 Claims, 11 Drawing Figures

MICROFICHE READER/PROJECTOR

The present invention is generally directed to a visual display device which displays on a screen the information appearing on an information-bearing microform member and in particular, to an improved microfiche reader and projector.

It is well known to project recorded information appearing on an information-bearing microform member onto a screen for the purpose of display. Because the recorded information on the member is greatly reduced in size, it is necessary to provide a magnified displayed image.

While such devices have been generally successful to this end, they have suffered from a number of drawbacks. For instance, such devices include relatively crude mechanisms for positioning selected areas or elements of the member relative to a projection lens. Lining up the member with the projection lens is therefore difficult and time-consuming, and in a business environment where most of these devices are used, such can be burdensome and an annoyance. In addition, prior devices have also suffered from crude focusing mechanisms, also lending to burdensome use of such equipment.

These shortcomings are greatly amplified as higher magnification of the displayed image is attempted. It is desirable to seek such higher magnification because individual elements on each microform member may be correspondingly reduced in size allowing an increased amount of information to be incorporated on each member.

Prior art devices have additionally been restricted in their use. Generally, they are only suitable for operating on a desk top and providing a display on a screen which may be viewed by only a few viewers at a time. If such devices were attempted to be used for providing an image of increased size on an independent spaced apart surface, such as a blank wall or a projection screen, the crude focusing and microform member placement mechanisms would make such use difficult, if not impossible, especially at higher magnifications.

It is, therefore, a general object of the invention to provide an improved visual display device.

It is another object of the present invention to provide an improved microfiche reader.

It is a particular object of the invention to provide a microfiche reader with mechanisms for precisely positioning selected areas of an information-bearing microform member relative to a projection lens, and for precisely focusing the projection lens.

It is a still further object of the present invention to provide such a microfiche reader which may be also used as a projector.

Generally in accordance with the present invention, a visual display device is provided, including a housing, a projection lamp assembly within the housing for directing light toward a projection lens, a microform carriage for supporting an information-bearing microform member and supported adjacent to the projection lens within the housing but allowing for longitudinal movement thereof, and a system for displaying selected areas of the member on a viewing screen, while achieving improved control of positioning of selected areas of the microform member relative to the projection lens, and permitting improved precise focus control. The improvement comprises a control member, means for imparting longitudinal movement to the control member, an outwardly extending arm coupled to the control member and longitudinally moved therewith, a pair of pulleys supported on the carriage, and a belt connected approximately at an intermediate point to the outwardly extending arm coupled to the control member, each end of the belt looped around a corresponding pulley, and secured to the housing forming a block and tackle drive arrangement.

The present invention also provides in a visual display device of the type comprising a housing, a projection lamp assembly within the housing for directing light toward a projection lens, the lens being movably supported by a support plate within the housing, a microform carriage supported adjacent to the lamp for holding an information-bearing microform member, and a system for displaying selected areas of the member onto a viewing screen, the improvement providing more accurately controlled movement of the projection lens for finer focusing of the displayed image to allow a higher magnification display on the screen. The improvement comprises a first gear of a first diameter, a second gear of a second diameter directly engaged with the first gear, the second diameter being greater than the first diameter, a travel plate having an elongated slot, the slot being inclined relative to the direction of travel of the travel plate, means for coupling the second gear to the travel plate, and a pin coupled to and extending from the projection lens and positioned within the slot.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

The present invention is generally directed to visual display devices which display on a screen the information appearing on an information-bearing microform member and in particular, to an improved microfiche reader and projector. It is to the latter, the improved microfiche reader and projector, that the preferred embodiment will be directed. However, it will be appreciated that the invention applies to other similar devices as well.

Figure 1:
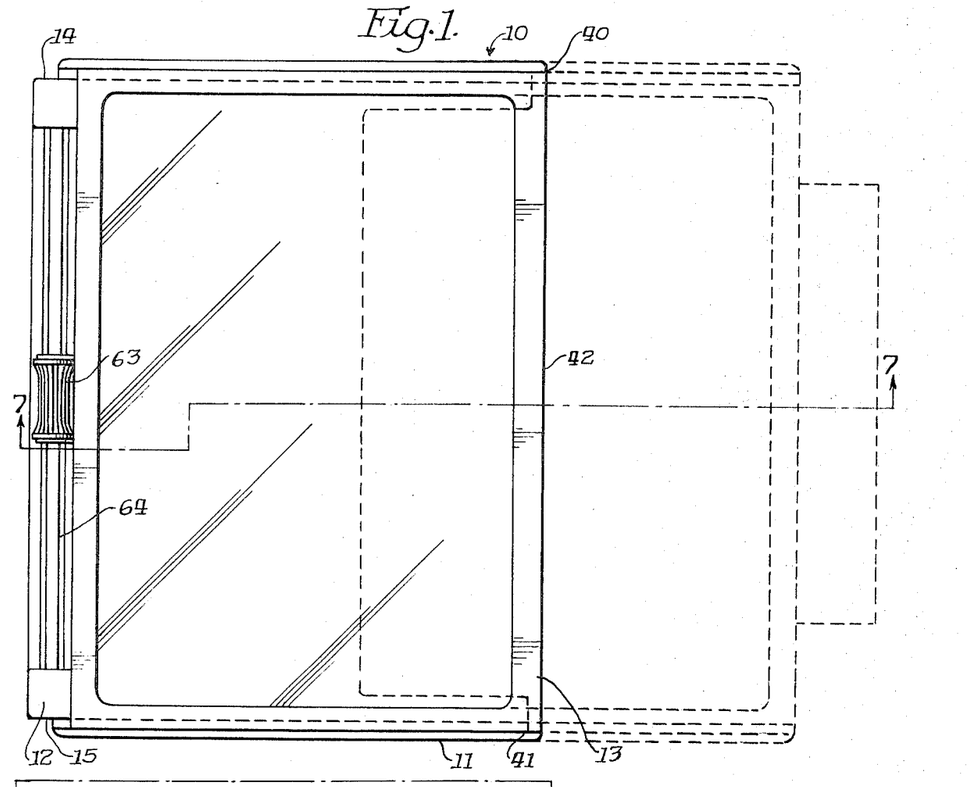
FIG. 1 is a side view of a microfiche reader and projector embodying the present invention.

Referring to the drawings and particularly to FIG. 1, the microfiche reader and projector 10 is contained within a hollow two-part housing 11 formed of metal, plastic or other suitable rigid material. The two-part housing consists of a modular housing 12 disengagingly mounted to and telescopically received by housing 13. Housing 12 comprises a top wall 14, a bottom wall 15 spaced from the top wall and parallel thereto, a rear wall 16 and a front wall 17 integral with the rear wall 16.

Figure 3:
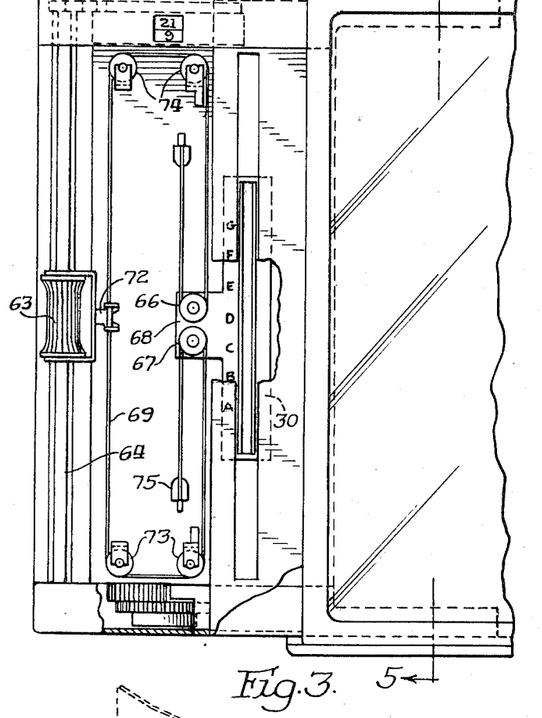
FIG. 3 is a fragmentary view, partially cut away, taken along lines 3 — 3 of FIG. 2.
Figure 7:
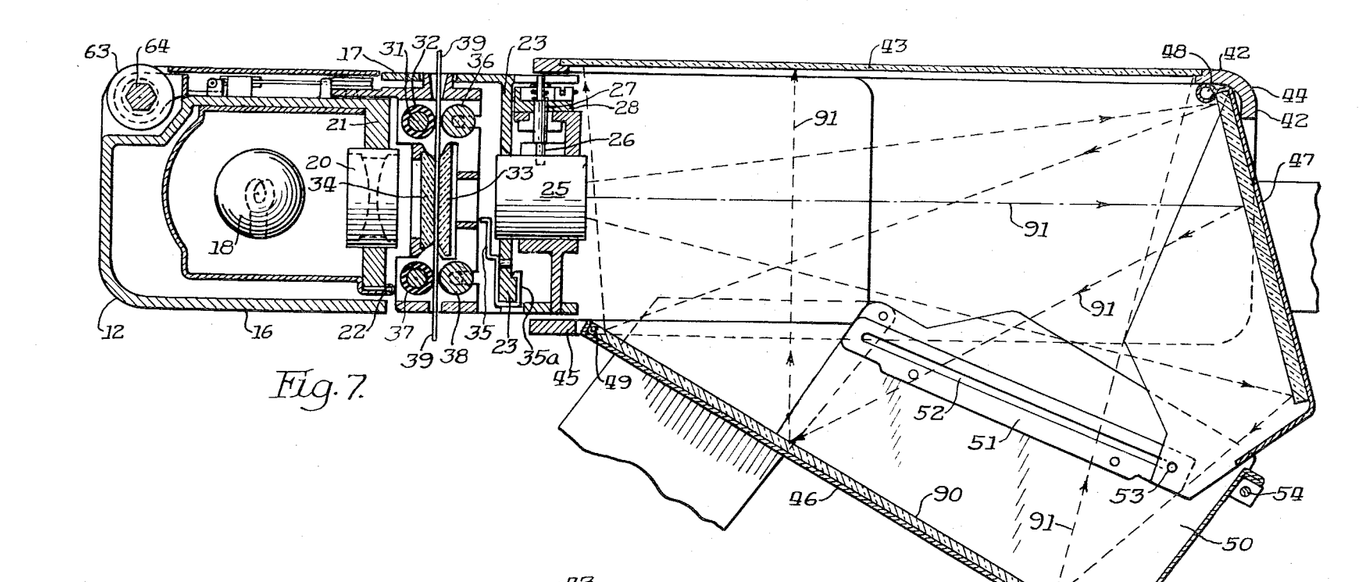
FIG. 7 is a cross-sectional view taken along lines 7 — 7 of FIG. 1.

As shown in FIG. 7, a projection lamp 18 is provided, and a reflector 19 may be employed mounted between lamp 18 and housing 12. The reflector is positioned so that the light from the lamp is directed through a condensing lens 20 carried by a combined lens mount and cover plate 21. Lamp 18, reflector 19, and condensing lens 20, comprise a projection lamp assembly for directing the light from lamp 18 toward projection lens 25. The lens mount and cover plate 21, as shown in FIG. 3, is L-shaped in cross-section and serves both to cover the front of housing 12 and the projection lamp compartment while providing a vertical support for condenser 20. The lens mount and cover member 21 is hinged at 22 to provide access to the projection lamp 18.

The top and bottom walls 14, 15 of housing 12 extend outwardly in the direction of housing 13 to provide guides upon which the housings can slide. A second lens mount support plate 23 is secured at each end to rear and front walls 16, 17 in a position which is spaced from but parallel to the condenser lens mount. The projection lens 25 is coupled to pin 26 which extends from lens 25 and, at its end opposite the projection lens, is positioned within a slot 27 of travel plate 28. As will be described in more detail later, slot 27 is inclined relative to the direction of travel plate 28, and upon movement of travel plate 28, pin 27 rides along the slot imparting movement to the lens 25 thereby providing focusing for lens 25.

A carriage 30 for holding an information-bearing microform member is supported in place by the inner shaft 31 of roller 32. By being supported by the inner shaft of roller 32, the carriage is supported within the housing but allowed to move longitudinally. The carriage 30 consists of opposed plates 33, 34 between which the information-bearing member 39 is received in a manner hereinafter more fully described.

Housing 13 comprises a top wall 40, a bottom wall 41 and a front wall 42 in which there is carried a rear projection screen 43. A short side wall 44 integral with the front wall 42 partially encloses one side of housing 13. A panel 45 partially encloses the rear of housing 13. As best shown in FIG. 7, the housing 13 is thus provided with side and rear openings through which swingable mirror mounts 46, 47 may move. The first mirror mount 47 is swingably secured between the top and bottom walls 40, 41 as shown at 48a. The second swingable mirror mount 46 is pivoted at 49 between the top and bottom walls 40, 41.

Figure 8:
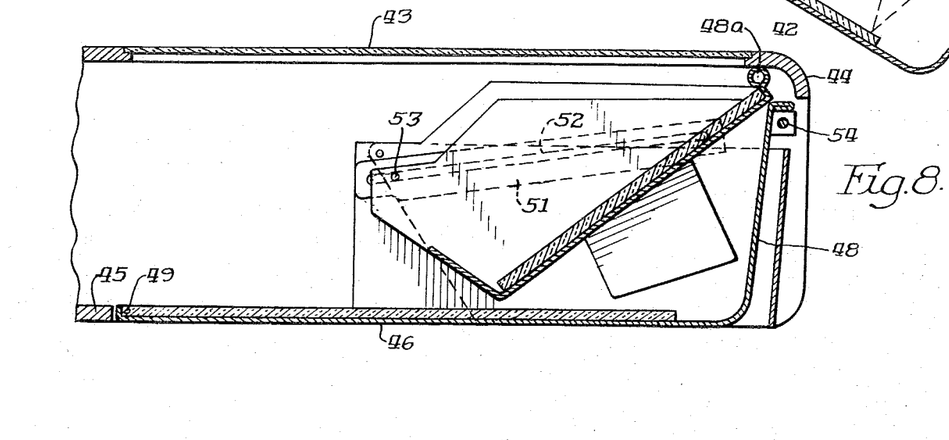
FIG. 8 is a fragmentary view showing the housing elements interfolded when not in use.

When the two mirror mounts 46, 47 are in the closed position as shown in FIG. 8, they serve to complete the rear and side walls of housing 13. During the operation of the microfiche reader, the housing 13 is laterally displaced with respect to housing 12 as shown in dashed lines in FIG. 1 and in full lines in FIG. 7. The swingable mirror mounts 46, 47 are then free to move outwardly as illustrated in FIG. 7 to enclose a larger volume and provide for a longer folded light path as indicated by the arrows 91 in FIG. 7. The mirror mount 46 is provided with upstanding walls 50 to which are secured elongated brackets 51. The brackets 51 are provided with slots 52 within which a pin 53, carried by the mirror mount 47, may travel. In this manner, the specific relationship between the mirror mounts 46, 47 is maintained and the two members are positively linked together at all times. The mirror mounts 46, 47 in the closed position are securely locked in place by means of spring-loaded latch 54.

As shown in FIG. 7, lens support plate 23 has attached to it light shield 35 which partially shields the light from projection lamp 18 to thereby eliminate direct illumination of rear projection screen 43. It can be appreciated that the present invention is concerned primarily with microfiche readers which provide relatively high magnification displays. Because lens 25 provides the higher magnification, it is possible that light emanating from projection lamp 18 will be bent by projection lens 25 to a sufficient degree to cause direct illumination of rear projection screen 43. Therefore, shield 35 eliminates this possibility. Shield 35 is secured in place by clip end 35a onto projection lens support 23 as shown in FIG. 7.

Figures 5, 6:
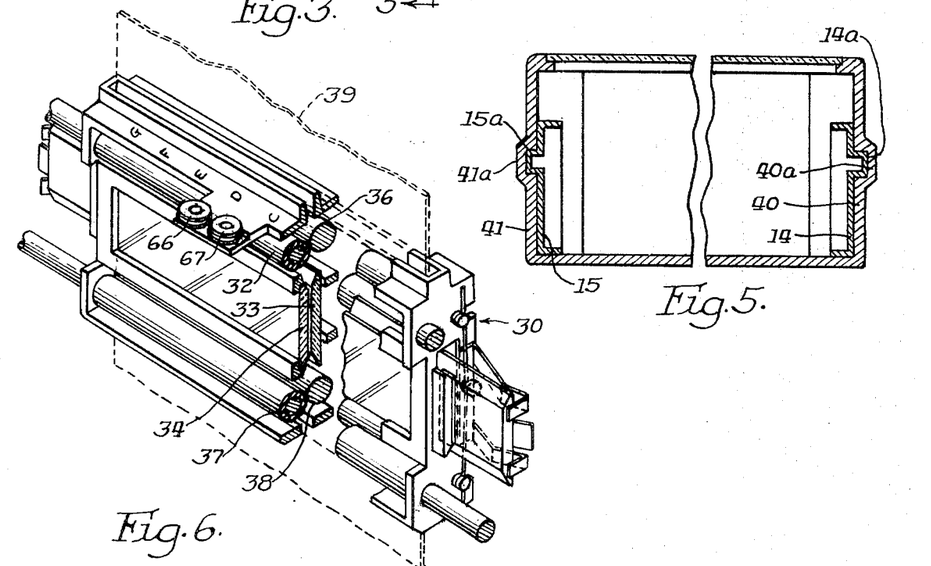
FIG. 5 is a fragmentary cross-sectional view taken along line 5 — 5 of FIG. 3.
FIG. 6 is a perspective view, partially cut away, showing a microform member carriage of the type embodying the present invention.

Carriage 30, as can be seen best in FIG. 6, has two sets of rollers comprising rollers 32, 36, 37 and 38. The rollers are positioned in such a way so that an information-bearing microform member 39 placed into carriage 30 will be urged toward plate 33 and placed in contact therewith. This assures that optimum and repeatable focusing will be maintained.

The manner in which housing 13 is carried upon disengageable housing 12 is best shown in FIG. 5. Housing 13 has top and bottom walls 40 and 41 configured to provide notches 40a, 41a, which receive guides 15a, 14a, on top and bottom walls 14, 15 of housing 12. The guides and notches provide a slidable arrangement such that housing 12 is disengagingly mounted to housing 13 for disengagement therefrom. When the microfiche reader is to be used, housing 12 and housing 13 are separated as shown in FIG. 1, the separation being controlled by the aforementioned guides and slots. This construction provides for smooth and positive movement between the two housings.

Figure 2:
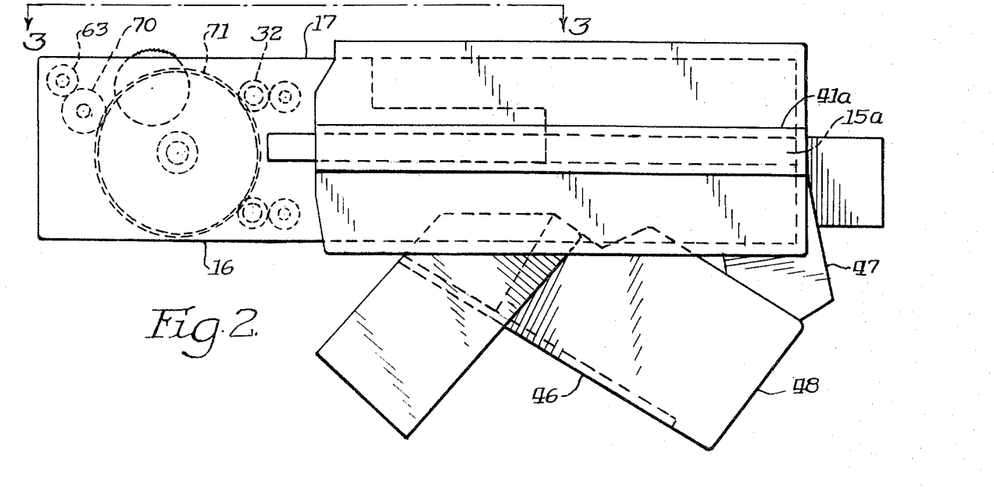
FIG. 2 is a bottom view of the microfiche reader and projector shown in FIG. 1.
Figure 4:
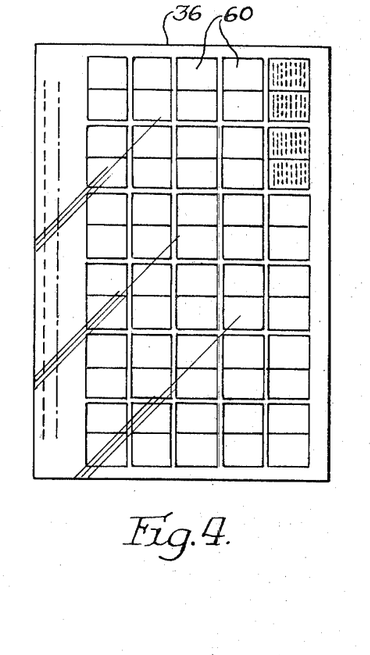
FIG. 4 is a front view of an information-bearing microform member such as is used in the combined reader and projector described and shown herein.

In view of the foregoing, the operation of the combined microfiche reader and projector will become apparent. With housing 13 extended in the manner shown in FIGS. 1 and 7, the projection lamp 18 is connected to a suitable source of electrical potential (not shown). The swingable mirror mounts 46, 47 are open to the position shown in FIG. 7. An information-bearing microform member 39, such as a microfiche card as shown in FIG. 4, and consisting of a plurality of discrete microform images 60, is slid into the carriage 30 between plates 33 and 34. The microfiche card 39 is grasped between the rollers as best shown in FIG. 7. Roller 32 has a frictional material applied thereon, such as rubber, for moving card 39 in a vertical direction. Vertical movement of the card is achieved by means of roller 32 being coupled to control member 63. Control member 63 is slidably carried upon a hexagonal rod 64 in such a manner that it can slide lengthwise of the rod, but is nevertheless keyed thereto. Control member 63 is coupled to roller 32, as shown in FIG. 2, by means of gear members 70 and 71. As control member 63 is rotated, it imparts rotational movement to gear member 70 and 71 which, in turn, impart rotational movement to roller 32 which frictionally moves microfiche card 39 in the vertical direction.

For imparting longitudinal movement to microfiche card 39, control member 63 is also utilized. As previously explained, control member 63 is slidably mounted on hexagonal cross-section rod 64. As shown in FIG. 3, carriage 30 has a pair of pulleys 66 and 67 secured to an outwardly extending flange 68 of carriage 30. Coupling control member 63 to the carriage pulleys is belt 69 which is secured to an outwardly extending arm 72 of control member 63 at approximately an intermediate point. The ends of belt 69 are looped around two sets of pulley belt guides 73, 74, one set for each pulley of carriage 30. The ends of the belt are looped around each set of guides, around each pulley 68, 67, and are secured to housing 12 at tie points 75 and 76. This arrangement provides carriage 30 with a split block and tackle arrangement providing a mechanical advantage for precisely longitudinally positioning selected areas of microfiche card 39 by the longitudinal movement of control member 63. Hexagonal cross-section rod 64 is secured at each end to the top and bottom walls of housing 12.

With the arrangement previously described, microfiche card 39 may be positioned precisely to the horizontal and longitudinal placement desired for selected viewing of selected areas of the microfiche card.

Figure 9:
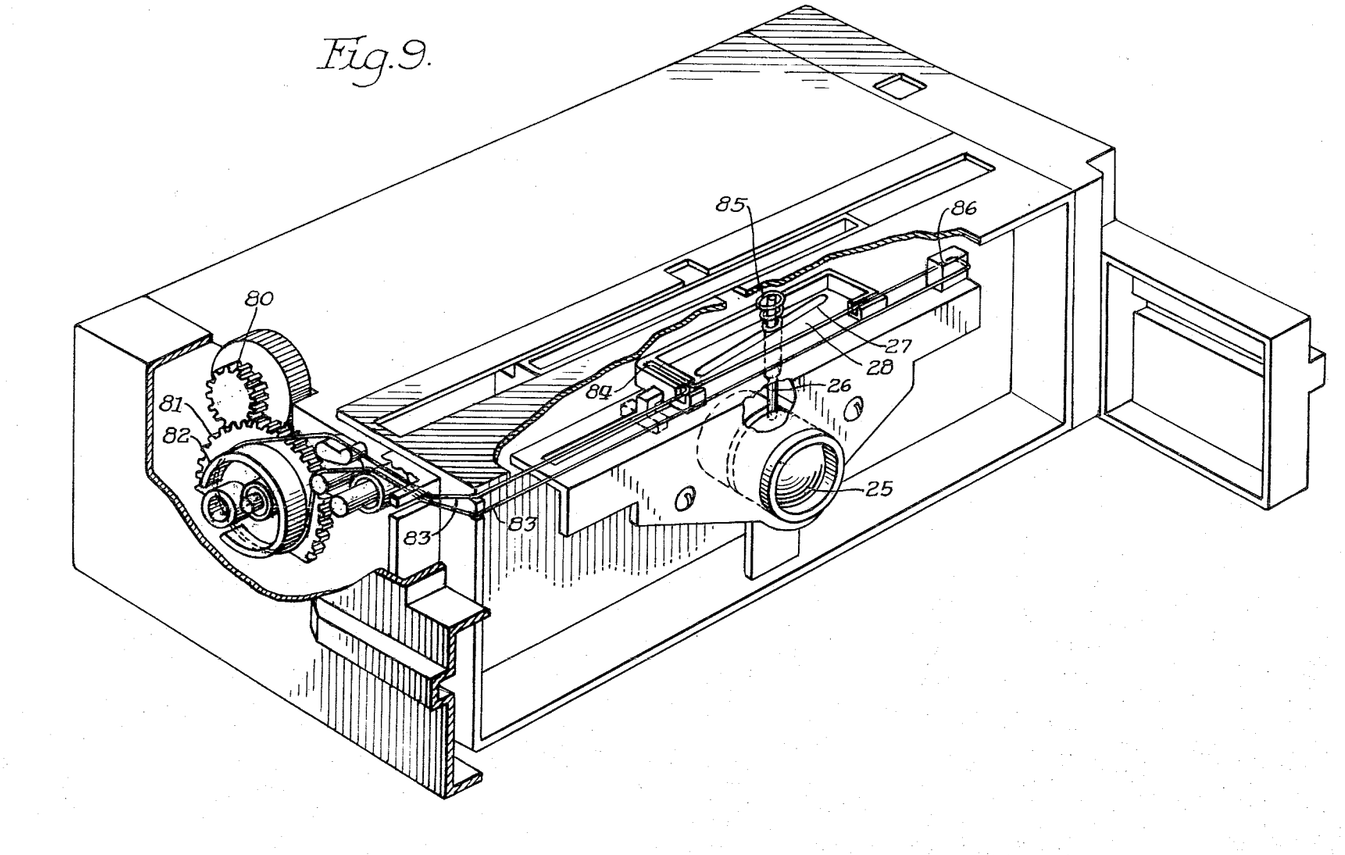
FIG. 9 is a perspective view, partially cut away, showing the improved means for focusing the microfiche reader in accordance with the present invention.

Light from lamp 18 passing through condensing lens 20 is directed through the selected area of microfiche card 39 into projection lens 25. The projection lens 25 is focused by the arrangement as shown in FIG. 9. Lens 25 has coupled to it pin 26 which extends from the lens and is positioned in slot 27 of travel plate 28 and confined in place by spring clip 85. Slot 27 is inclined to the direction of travel of pin 28 such that when travel plate 28 moves, the pin 26 rides along slot 27 to impart focusing movement to lens 25. Travel plate 28 is moved by means of first gear 80 directly engaged with a second gear 81. Second gear 81 is of a greater diameter than first gear 80, thereby providing a mechanical advantage. Coupled concentrically to gear 81 is pulley 82 which has a cable or belt 83 frictionally looped around it and which is also coupled around guide post 86 and to travelling plate 28 at belt clamp 84 integral with travel plate 28. As first gear 80 is rotated, it imparts a rotation to gear 81 which in turn imparts rotation to pulley 82 to thereby cause belt 83 to move. As belt 83 moves, it carries with it travel plate 28 which, as previously explained, imparts focusing action to lens 25 by means of slot 27 and pin 26 riding within the slot.

In this manner, projection lens 25 can be accurately focused due to the mechanical advantage resulting from the relative diameters of the first and second gears and the extended slot 27. It can be appreciated that this is important, especially when higher magnification is provided by lens 25.

Light coming from the projection lens 25 is directed upon a first mirror 89. In the operating position shown in FIG. 7, the first mirror is angularly disposed with respect to the optical axis of lens 25 and therefore reflects the image projected thereon downwardly at an angle up to the face of a second mirror 90 carried by the second mirror mount 46.

As shown by arrows 91 indicating the folded light path within housing 13, the light reflected from the mirror 90 is directed upwardly to the rear surface of the rear projection screen 43 from which it may be viewed by the user of the microfiche reader.

The light path 91 can be lengthened or shortened within the travel of the housing 13 upon housing 12 by telescopingly sliding the housings with respect to each other. As the light path is lengthened, the magnification will be increased upon the screen 43. On the other hand, should it be desired to increase the magnification beyond the possible length of the light path within housing 13, modular housing 12 may be completely removed from housing 13, in which event, the light coming from the projection lens 25 may be directed upon an independent spaced apart surface such as a wall or even the ceiling. As previously explained, housing 12 comprises a disengagingly mounted module comprising the lamp projection assembly and projection lens which may be used as a portable projector. In this event, the microfiche reader operates as a projector wherein the size of the magnification is related to the distance of the projector from the screen upon which the image is focused.

Figures 10, 11:
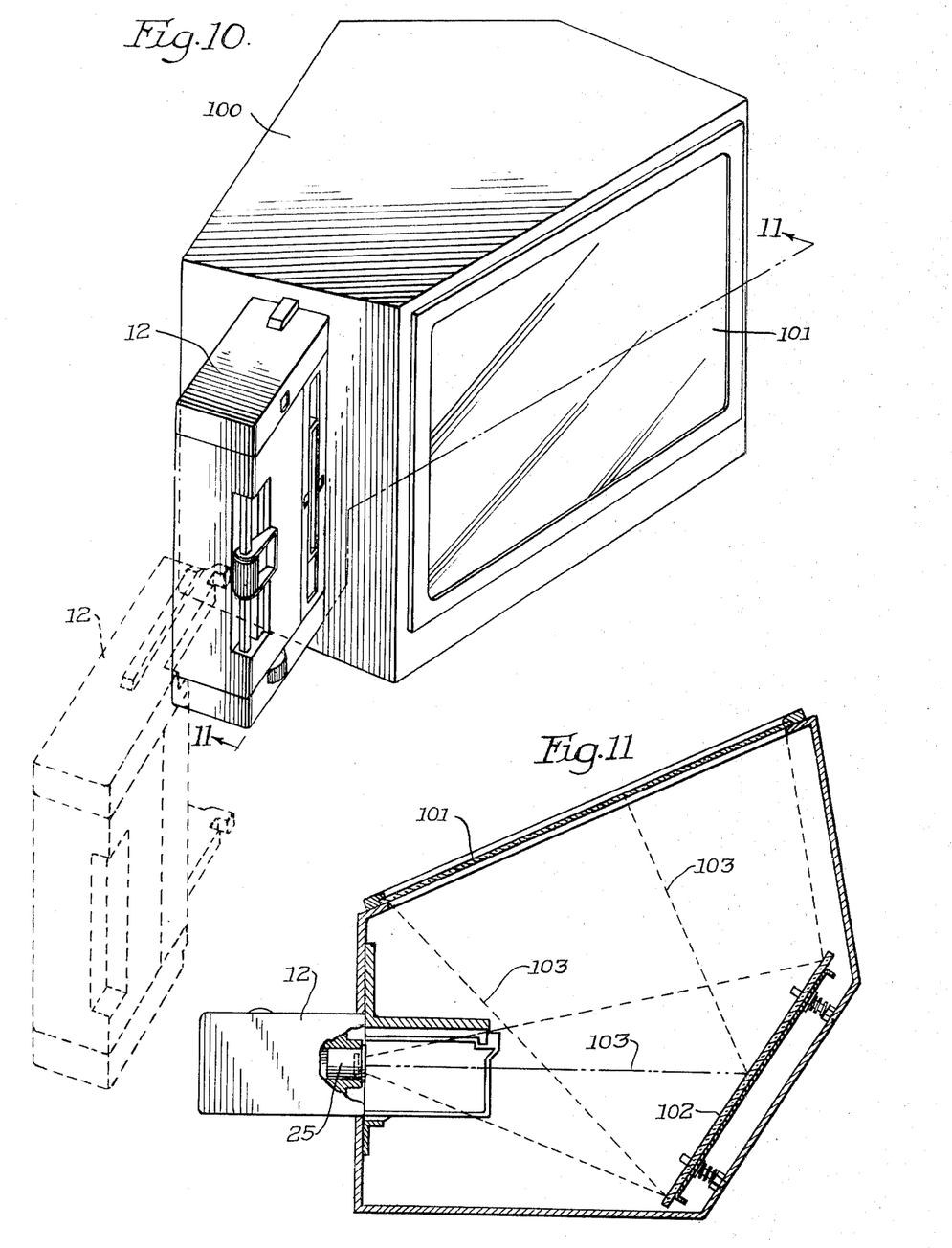
FIG. 10 is a perspective view showing the disengaged module embodying the present invention in connection with a desk top reader system.
FIG. 11 is a cross-sectional view, partially cut away, taken along lines 11—11 of FIG. 10.

In furtherance of this feature, reference may be made to FIGS. 10 and 11. Housing 12 has been disengaged from housing 13, as shown in dashed lines. In solid lines, housing 12 is represented as being inserted into a desk top reader. Since housing 12 is of modular construction, all the features afforded in the microfiche reader previously described are also afforded in the unit when it comprises a desk top reader. Shown in FIG. 10 is housing 12 incorporated within desk top reader 100 which may provide an extended light path for increased magnification to thereby provide a larger display on viewing screen 101 than is obtained in the portable briefcase microfiche reader. FIG. 11 shows this structure in cross-section form. Housing 12 comprising the lamp assembly and projection lens 25 projects an image onto mirror 102 which is then reflected onto viewing screen 101. The arrows 103 indicate the light path. Additional reflective surfaces may be provided, if desired, to obtain a further folded light path.

As can be understood from the previous description, the present invention provides a microfiche reader which may be used in almost any environment. Because higher magnification can be use, more information may be incorporated onto the information bearing member, such as a microfiche card. Additionally, the higher magnifications are possible because a more precise means for longitudinally positioning the microfiche card and focusing the projection lens is provided. Because the projection lamp assembly is disengagingly mounted within the display portion of the microfiche reader, it may be disengaged therefrom and used as a projector for projecting an image onto an independent spaced apart surface for obtaining a reproduction of any desired size. In addition, it may be used also in other suitable display devices provided with suitable reflective surfaces and projection screens, thus extending its versatility.

While a particular embodiment of the invention has been shown and described, it will be obvious to those

We claim

1. In a visual display device of the type comprising a housing, a projection lamp assembly within said housing for directing light toward a projection lens, a movably mounted microform carriage for supporting an information-bearing microform member in optical communication with said projection lens within said housing, and a system for displaying selected areas of said member onto a viewing screen, the improvement providing more accurate positioning of selected areas of said microform member relative to said projection lens, thus allowing a higher magnification display on said screen, comprising;
a control member;
means for providing longitudinal movement to said control member;
an outwardly extending arm coupled to said control member and longitudinally movable therewith;
a pair of pulleys supported on said carriage; and
cable means connected approximately at an intermediate point to said outwardly extending arm coupled to said control member, each end of said cable means looped around a corresponding pulley and secured to said housing forming a block and tackle drive arrangement;
whereby, longitudinal motion of said control member is translated into longitudinal travel of said microform carriage aided by a mechanical advantage for precise positioning of said selected area of said microform member relative to said projection lens.

2. A visual display device in accordance with claim 1 wherein said means for providing longitudinal movement of said control member comprises a rod carried by said housing and where said control member is slidably carried upon said rod.

3. A visual display device in accordance with claim 1 where said housing comprises top and bottom walls, said microform carriage comprises spaced plates for receiving said microform member therebetween, and where an elongated rod is secured at each end to said top and bottom walls and freely supporting at least one of said plates for affording longitudinal movement of said microform carriage.

4. A visual display device in accordance with claim 1 wherein said device additionally comprises a light shield supported within said housing and partly shielding the light from said lamp assembly to thereby eliminate direct illumination of said screen from said lamp.

5. A visual display device in accordance with claim 1 wherein said projection lamp assembly, said projection lens, and said microform carriage constitute a module disengagingly mounted to said housing for disengagement therefrom and for projecting a display on an independent physically removed surface to obtain an image of a desired enlarged size.

6. A visual display device in accordance with claim 1 which further comprises two sets of belt guides and where each end of said cable means is looped around a corresponding set of said guides.

7. A visual display device in accordance with claim 1 which includes roller means for vertically moving said microform in said carriage and gear means for coupling said control member to said roller means, whereby rotational motion of said controlled member is translated into vertical movement of said microform in said carriage.

8. In a visual display device of the type comprising a housing, a projection lamp assembly within said housing for directing light toward a projection lens, said lens being movably supported by a support plate within said housing, a microform carriage supported adjacent to said lamp for holding an information-bearing microform member, and a system for displaying selected areas of said member onto a viewing screen, the improvement providing more accurately controlled movement of said projection lens for finer focusing of said displayed image to allow a higher magnification display on said screen, comprising:
a first gear of a first diameter;
a second gear of a second diameter directly engaged with said first gear, said second diameter being greater than said first diameter;
a travel plate having an elongated slot, said slot being inclined relative to the direction of travel of said travel plate;
means for coupling said second gear to said travel plate; and
a pin coupled to and extending from said projection lens and positioned within said slot;
whereby, as said first gear is rotated, it translates rotation onto said second gear causing movement of said travel plate such that said pin rides along said slot for imparting movement to said lens, the relative diameters of said gears providing a mechanical advantage affording highly precise movement of said lens.

9. A visual display device in accordance with claim 8 wherein said means for coupling said second gear and said travel plate comprises a pulley concentrically secured to said second gear.

10. A visual display device in accordance with claim 9 wherein said means for coupling said second gear to said travel plate additionally comprises a belt frictionally looped around said pulley and connected to said travel plate.

11. A visual display device in accordance with claim 8 wherein said projection lamp assembly, said projection lens, and said microform carriage constitute a module disengagingly mounted to said housing for disengagement therefrom and for projecting a display to an independent spaced apart surface to obtain an image of any enlarged size.

12. A visual display device in accordance with claim 8 further comprising a light shield secured to said housing and partially shielding the light from said lamp assembly to thereby eliminate direct illumination of said screen.

13. A visual display device comprising:
a housing;
a projection lamp assembly within said housing for directing light toward said projection lens;
means for providing controlled movement of said lens for focusing said displayed image comprising a first gear of a first diameter, a second gear of a second diameter directly engaged with said first gear, said second diameter being greater than said first diameter, a pulley concentrically secured to said second gear, a travel plate having an elongated slot, said slot being inclined relative to the direction of travel of said travel plate, a pin coupled to and extending from said projection lens and positioned within said slot, and a belt frictionally looped around said pulley and connected to said travel plate;

a microform carriage for supporting an information bearing microform member and supported adjacent to said projection lens within said housing but allowing for longitudinal movement thereof;

means for positioning selected areas of said microform member relative to said projection lens comprising a rod carried by said housing, a control member slidably carried upon said rod; an outwardly extending arm coupled to said control member and longitudinally movably therewith, two sets of belt guides extending from said housing, a pair of pulleys supported on said microform carriage, and a belt connected approximately at an intermediate point to said outwardly extending arm coupled to said control member, each end of said belt looped around a corresponding set of belt guides and pulley, and secured to said housing forming a block and tackle drive arrangement;

said projection lamp assembly, said projection lens, and said microform carriage constituting a module disengagingly mounted to said housing for disengagement therefrom and for projecting a display on an independent spaced apart surface to obtain an image of any enlarged size.

* * * * *